United States Patent [19]
Folsom et al.

[11] Patent Number: 6,062,022
[45] Date of Patent: May 16, 2000

[54] CONTINUOUSLY VARIABLE HYDROSTATIC TRANSMISSION INCLUDING 1:1 RATIO LOCK-UP CLUTCH

[75] Inventors: Lawrence Ray Folsom; Clive Tucker, both of Pittsfield, Mass.

[73] Assignee: General Dynamics Land Systems, Inc., Sterling Heights, Mich.

[21] Appl. No.: 09/062,728

[22] Filed: Apr. 20, 1998

Related U.S. Application Data

[60] Provisional application No. 60/044,324, Apr. 25, 1997.

[51] Int. Cl.$^7$ .................................................. F16D 39/00
[52] U.S. Cl. .............................................. 60/438; 60/436
[58] Field of Search ............................. 60/436, 438, 492, 60/448; 91/506

[56] References Cited

U.S. PATENT DOCUMENTS

| | | |
|---|---|---|
| 4,932,208 | 6/1990 | Koyama et al. ........................... 60/448 |
| 5,423,183 | 6/1995 | Folsom . |
| 5,486,142 | 1/1996 | Folsom . |
| 5,493,862 | 2/1996 | Folsom . |
| 5,524,437 | 6/1996 | Larkin et al. . |
| 5,535,589 | 7/1996 | Folsom . |
| 5,575,152 | 11/1996 | Folsom . |
| 5,678,405 | 10/1997 | Folsom ...................................... 60/488 |
| 5,904,043 | 5/1999 | Nagatomo ................................ 60/435 |

FOREIGN PATENT DOCUMENTS

| | | |
|---|---|---|
| 10-89441 | 4/1998 | Japan . |
| WO 96/31715 | 10/1996 | WIPO . |

*Primary Examiner*—Edward K. Look
*Assistant Examiner*—Thomas E. Lazo
*Attorney, Agent, or Firm*—Finnegan, Henderson, Farabow, Garrett & Dunner

[57] ABSTRACT

In a continuously variable hydrostatic transmission including a hydraulic pump unit driven by an input shaft, a grounded hydraulic motor unit, and an intermediate, wedge-shaped swashplate for developing torque on an output shaft in response to pumped exchanges of hydraulic fluid between the pump and motor units through swashplate ports, a ratio controller is provided to vary transmission ratio by changing the swashplate angular orientation and to engage a lock-up clutch directly mechanically coupling the input shaft to the output shaft when a 1:1 transmission ratio is set.

10 Claims, 8 Drawing Sheets

CONTINUOUSLY VARIABLE HYDROSTATIC TRANSMISSION INCLUDING 1:1 RATIO LOCK-UP CLUTCH

CROSS REFERENCE TO RELATED APPLICATIONS

The present application claims priority from a provisional application Ser. No. 60/044,324, filed Apr. 25, 1997.

REFERENCE TO RELATED PATENTS

The invention disclosed herein has particular application to continuously variable hydrostatic transmissions having wedge-shaped swashplates, such as disclosed in U.S. Pat. Nos. 5,423,183; 5,486,142; 5,524,437; and 5,678,405. The disclosures of these patents are incorporated herein by reference.

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

In the cited U.S. patents, hydraulic machines are disclosed as basically including a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is connected to the swashplate. When the pump unit is driven by the prime mover, hydraulic fluid is pumped back and forth between the pump and motor units through specially configured ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied. Since the transmission ratio, i.e., speed ratio of input shaft/output shaft, is continuously variable between 1:0 and 1:1, the prime mover can run at a constant speed set essentially at its most efficient operating point. The availability of a 1:0 (neutral) transmission ratio setting eliminates the need for a clutch. Unlike conventional, continuously variable hydrostatic transmissions, wherein hydraulic fluid flow rate increases proportionately with increasing transmission ratio such that maximum flow rate occurs at the highest transmission ratio setting, the flow rate in the hydraulic machines disclosed in the cited patents reaches a maximum at a midpoint in the ratio range and then progressively decreases to essentially zero at the highest transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating an optimum performance prime mover input, the hydraulic machines of the cited applications have a particularly advantageous application as a highly efficient, quiet, continuously variable hydrostatic transmission in vehicular drivetrains.

SUMMARY OF THE INVENTION

An objective of the present invention is to provide an improved continuously variable hydrostatic transmission.

Another objective of the present invention is to provide improvements in the provisions for controlling transmission ratio in continuously variable hydrostatic transmissions.

A further objective of the present invention is to provide an improved ratio controller for continuously variable hydrostatic transmissions of the type disclosed in the cited U.S. patents.

Yet another objective of the present invention is improved transmission performance and efficiency at a 1:1 transmission ratio.

To achieve these and other objectives, a continuously variable hydrostatic transmission according to the present invention comprises a housing; an input shaft journaled in the housing; a hydraulic pump unit driven by the input shaft; a hydraulic motor unit grounded to the housing; and a wedge-shaped swashplate positioned between the hydraulic pump and motor units and including ports accommodating pumped flow of hydraulic fluid between the hydraulic pump and motor units. The swashplate is connected to the output shaft in torque-coupled relation and pivoted to an infinite number of angular positions to respectively set an infinite number of transmission ratios.

The transmission further comprises a lock-up clutch coupling the input shaft directly to the output shaft and a ratio controller coupled to pivot the swashplate to angular positions setting transmission ratios between 1:0 and 1:1 and engaging the lock-up clutch when the swashplate is pivoted to an angular position setting the 1:1 transmission ratio.

Additional features, advantages, and objectives of the invention will be set forth in the description that follows, and, in part, will be apparent from the description, or may be learned from practice of the invention. The objectives and other advantages of the present invention will be realized and attained by the apparatus particularly pointed out in the written description and claims hereof, as well as the appended drawings.

It is to be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention, and, together with the description, serve to explain the principles of the invention.

BRIEF DESCRIPTION OF THE DRAWINGS

Corresponding reference numerals refer to like parts throughout the several views of the drawings.

DETAILED DESCRIPTION OF PREFERRED EMBODIMENT

Figure 1:
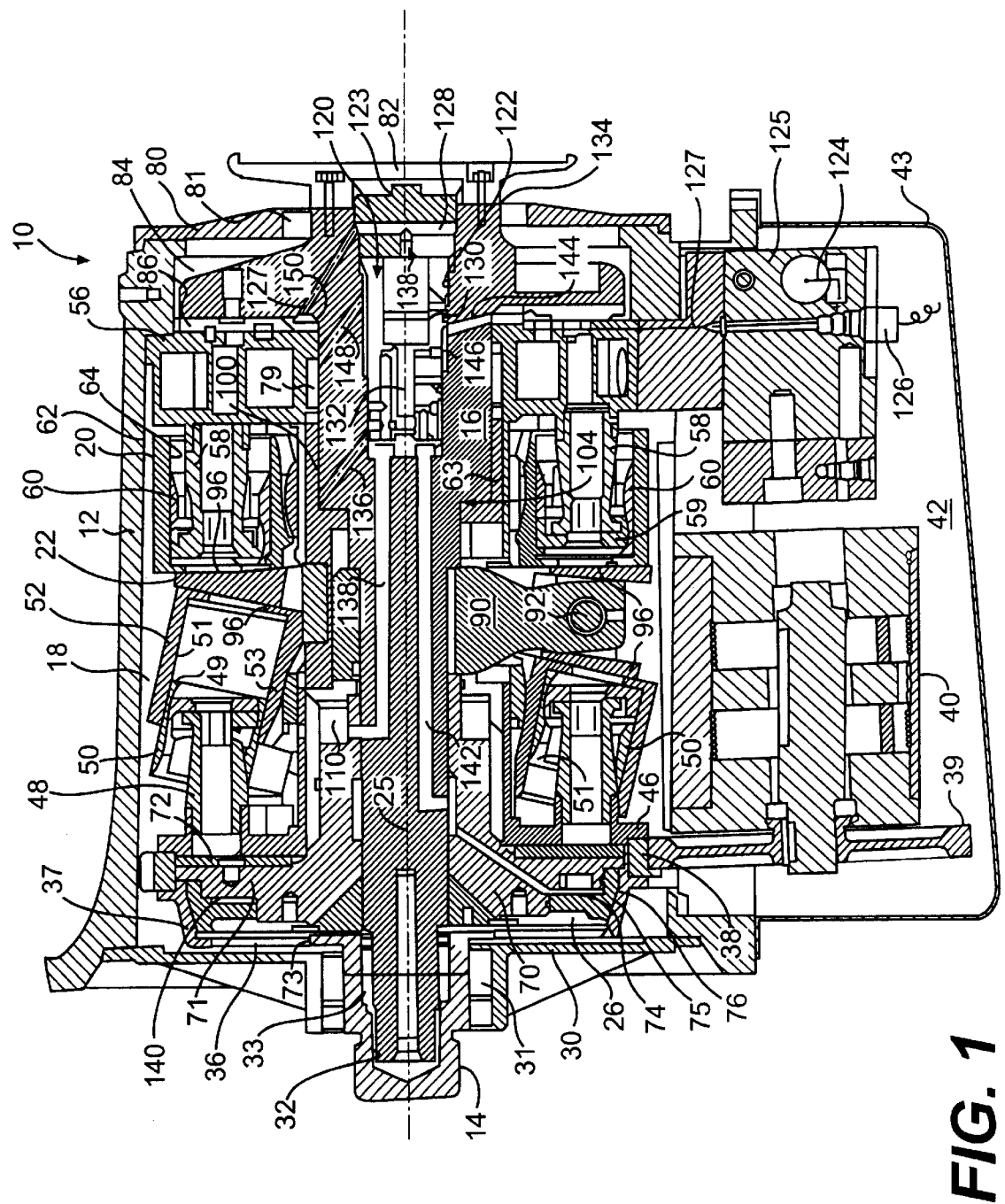
FIG. 1 is a longitudinal sectional view of a continuously variable hydrostatic transmission in accordance with the present invention.
Figure 4:
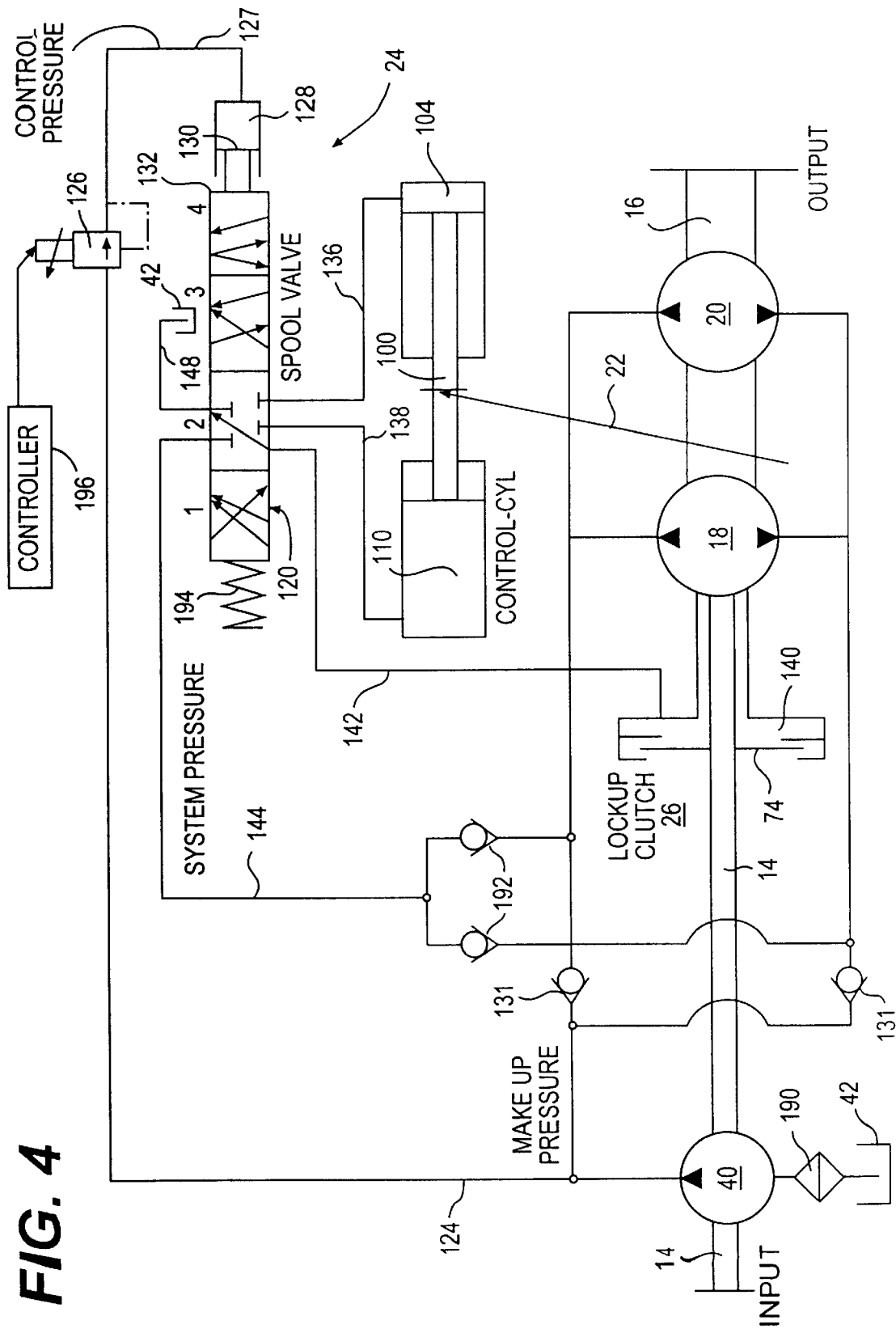
FIG. 4 is a hydraulic circuit diagram of the transmission of FIG. 1.

The continuously variable hydrostatic transmission according to the preferred embodiment of the present invention, generally indicated at 10 in FIG. 1, comprises, as basic components, a housing 12 in which are journaled an input shaft 14 and an output shaft 16 in coaxial, generally end-to-end relation. The end of input shaft 14 external to the housing is suitably adapted for driving connection to a prime mover (not shown), while the end of output shaft 16 external to the housing is suitably adapted for driving connection to a load (not shown). Input shaft 14 drives a hydraulic pump unit, generally indicated at 18. A hydraulic motor unit, generally indicated at 20, is grounded to housing 12 in axially opposed relation to pump unit 18. A wedge-shaped swashplate, generally indicated at 22, is drivingly connected to the output shaft 16 in a position between the pump and motor units and is ported to provide for the exchange of hydraulic fluid between the pump and motor units. A ratio controller, generally indicated at 24 in FIG. 4, is linked to the swashplate 22 for the purpose of pivotally adjusting the angle of swashplate orientation relative to the output shaft axis 25, thereby setting the transmission ratio of input shaft speed to output shaft speed. In accordance with a feature of the present invention, a lock-up clutch, generally indicated at 26, is engaged to directly couple input shaft 14 to output shaft 16 when ratio controller 24 pivots swashplate 22 into a 1:1 transmission ratio position.

Now referring to FIG. 1 in greater detail, generally cylindrical housing 12 includes an end cover 30 secured in place by bolts (not shown) to close off the open input end of the housing. Input shaft 14 extends into housing 12 through a central opening in the end cover, which is fitted with a roller bearing ring 31 serving to journal input shaft 14 for rotation. The input shaft is counterbored, as indicated at 32, to receive the left end terminal portion of output shaft 16. A roller bearing ring 33, fitted in counterbore 32, provides inner end journal support for output shaft 16. The inner terminal portion of input shaft 14 is flared to provide a radial flange 36 having an axially turned annular lip 37, which is affixed to an annular spur gear 38 by suitable means (not shown). This spur gear, driven by input shaft 14, meshes with a spur gear 39 fixed on the input shaft of a sump pump 40, which is positioned in a hydraulic fluid sump 42 provided by a pan 43 affixed to the bottom side of housing 12.

Also fixed to annular spur gear 38 is an annular piston carrier 46 for hydraulic pump unit 18. A radial extension of this carrier mounts an annular array of axially extending posts 48 having free ends adapted with spherical bearings 49 for respectively swivel mounting pump pistons 50. These pump pistons are slidingly received in an annular array of cylinders 51 formed in an annular pump cylinder block 52. An axial extension of carrier 46 mounts a spherical bearing 53 serving to swivel mount the pump cylinder bock. By virtue of the swivel mountings of pump pistons 50 and pump cylinder block 52, precessing motion of the cylinder block is accommodated as hydraulic pump unit 18 is driven by input shaft 14.

Still referring to FIG. 1, hydraulic motor unit 20 is essentially equivalent to hydraulic pump unit 18, except that it is grounded to housing 12 via an annular manifold block 56 by appropriate means (not shown). This manifold block, serving as a motor piston carrier, mounts an annular array of axially extending, hollow posts 58 having free ends adapted to mount spherical bearings 59 for respectively swivel mounting motor pistons 60. An annular motor cylinder block 62 is then swivel mounted by a spherical bearing 63 carried on an axial extension of manifold block 56. As in the case of pump cylinder block 52, the motor cylinder block includes an annular array of cylinders 64 for respectively slidingly receiving motor pistons 60. While the motor pistons and the motor cylinder block do not rotate, their swivel mountings accommodate precessing (nutating) motion of the motor cylinder block.

As further seen in FIG. 1, an annular flange 70 is keyed on output shaft 16 at an axial position to provide an extension 71 projecting radially between input shaft flange 36 and pump piston carrier 46. A nut 73 is threaded on output shaft 16 to fix the axial position of flange 70. The right radial face of flange extension 71 is recessed to receive an annular bearing plate 72, which may be adapted in the manner described in U.S. Pat. No. 5,493,862, to provide a hydrostatic thrust bearing effect between output shaft flange 70 and pump piston carrier 46 that typically rotate at different speeds. The left radial face of flange extension 71 is shouldered to accommodate an annular clutch plate 74 of lock-up clutch 26. The conical peripheral surface 75 of clutch plate 74 is shown in FIG. 1 as being in engagement with a conical inner surface 76 of flange lip 37 to provide a direct coupling of input shaft 14 to output shaft 16.

The right end of output shaft 16 extends through a central opening in an end cover 80 closing off the open output end of housing 12. A roller bearing ring 81, fitted in the end cover opening, provides journal support for the output shaft as it exits the housing. Intermediate journal support for the output shaft is provided by a roller bearing ring 79 fitted in the central opening of manifold block 56. A flange adapter 82, bolted to the termination of the output shaft, facilitates driving connection to a load (not shown). Integrally formed with the output shaft is a flange 84 that projects radially between end cover 80 and manifold block 56. A portplate 86 is pinned to the left radial face of flange 84 in sliding interfacial contact with manifold block 56.

Figure 3:
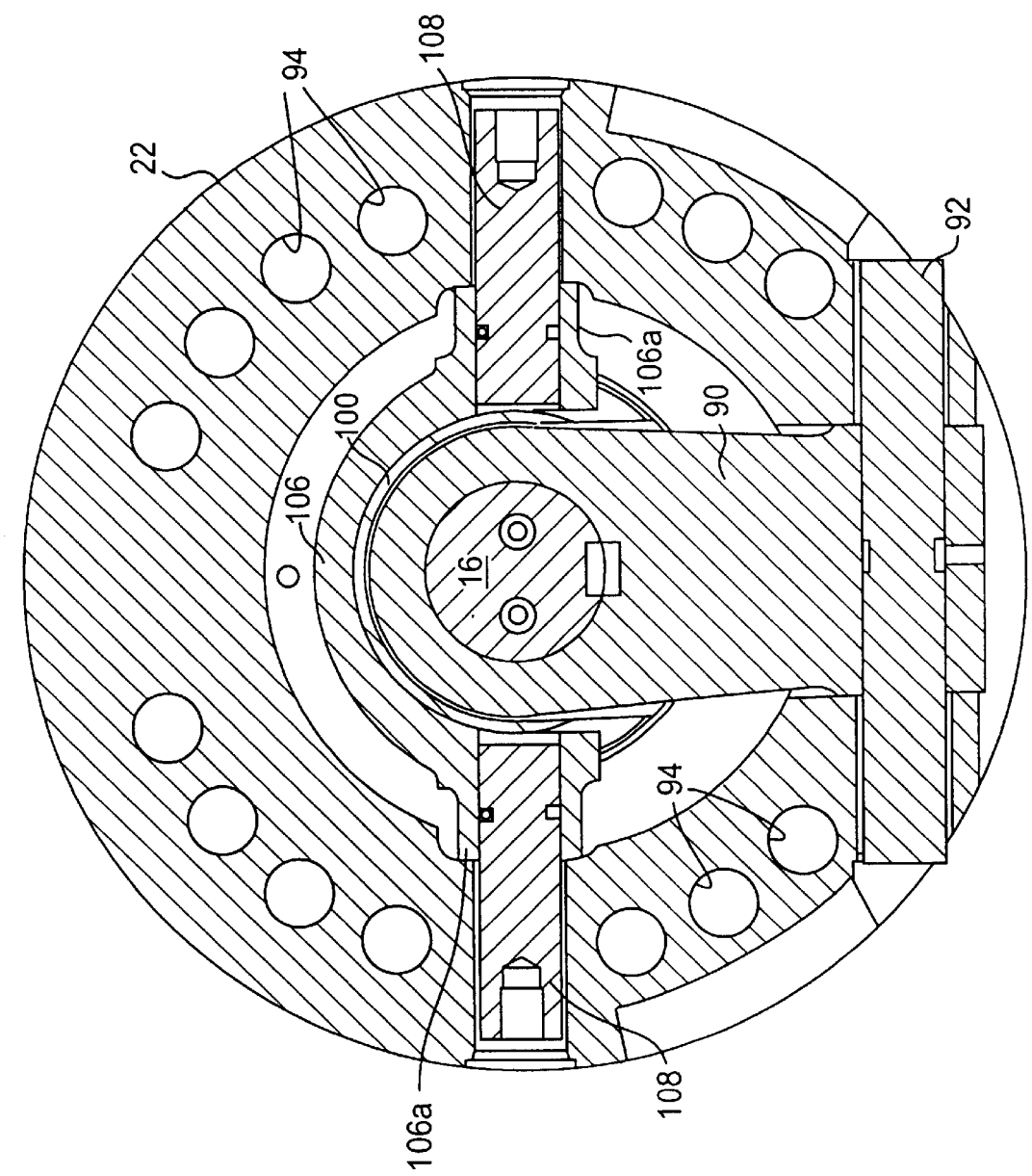
FIG. 3 is a sectional view taken along line 3–3 of FIG. 2.

As seen in FIGS. 1 and 3, an arm 90 is keyed in driving connection to output shaft 16 and extends radially outwardly to a termination that carries a transverse pin 92 pivotally connecting swashplate 22 to the arm. Input and output faces of the swashplate are relatively oriented at an acute angle to provide the wedge shape of the swashplate. Ports 94 (see FIG. 3) extend between kidney-shaped recesses (not shown) in the swashplate input and output surfaces, which are in sliding interfacial contact with end faces of pump 52 and motor 62 cylinder blocks. Openings 96 in the cylinder block end faces communicate with swashplate ports 94 to accommodate pumped exchanges of hydraulic fluid between pump unit 18 and motor unit 20. As described in the cited patents, torque is then generated on the swashplate, which is coupled via arm 90 to output shaft 16 as output torque.

Figure 2:
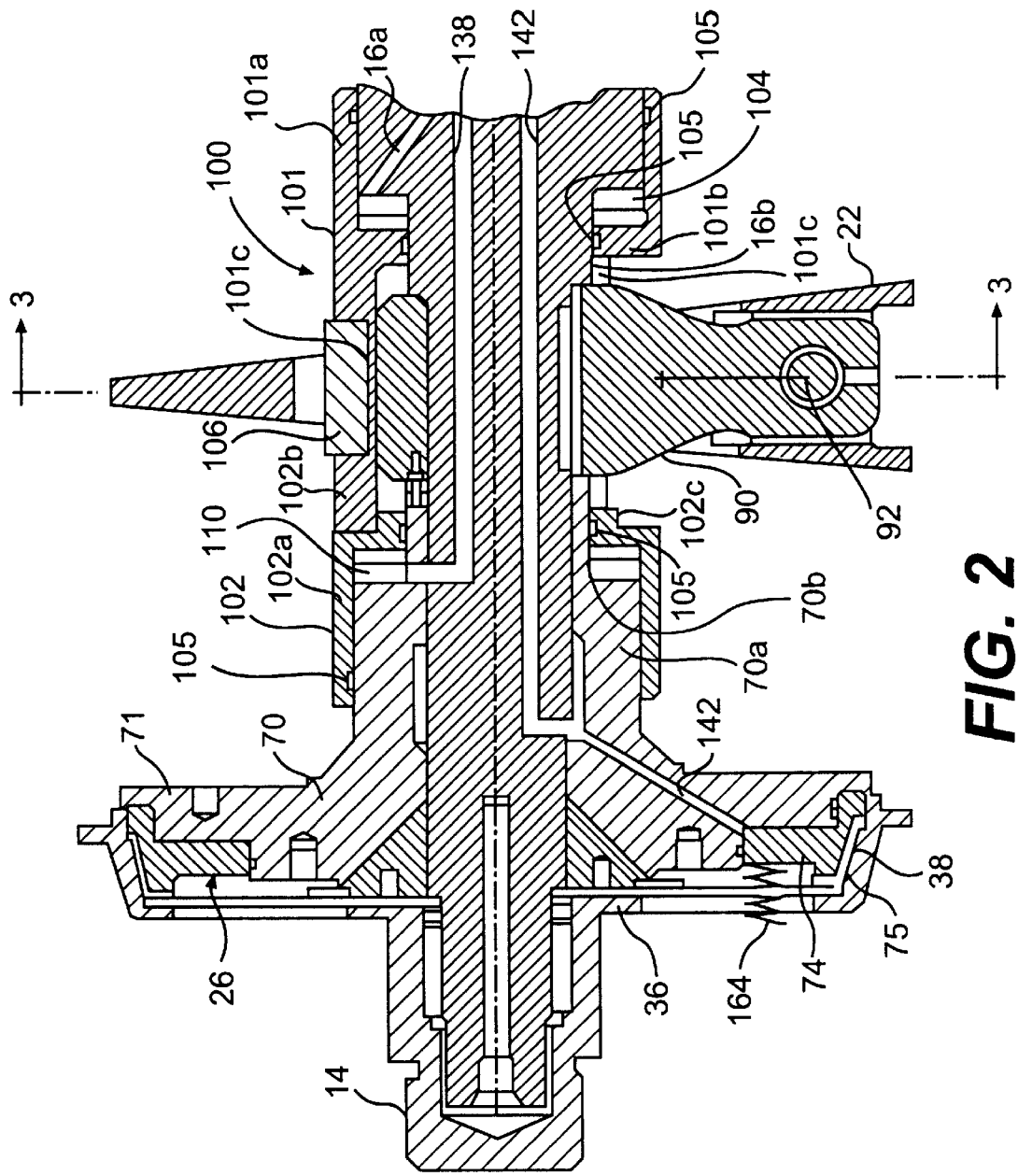
FIG. 2 is a fragmentary longitudinal sectional view of the transmission of FIG. 1 illustrating the positions of various parts when the transmission is set to a ratio between 1:0 and 1:1.

As one element of ratio controller 24, an annular actuating piston, generally indicated at 100 in FIGS. 1 and 2, is, in part, slidingly mounted on large diameter sections of output shaft 16 in axially spaced relation at opposed sides of swashplate 22. Actuating piston 100 is of a two-part construction consisting of an axially elongated, cylindrical part 101 and an axially shorter cylindrical part 102 joined together by suitable means (not shown). Piston part 101 has a rightwardly extending skirt 101a slidingly mounted on a large diameter section 16a of output shaft 16 and a radially inwardly extending shoulder 101b terminating in a cylindrical surface bearing against a reduced section 16b of the output shaft. The right radial face of piston shoulder 101b and the radial transition from the large diameter section 16a to the reduced diameter section 16b of the output shaft define the axial bounds of an annular actuating chamber 104, best seen in FIG. 2. Seals 105 fitted in skirt 101a and shoulder 101b render actuating chamber 104 fluid tight. The axial extension of piston part 101 leftward of shoulder 101b is formed with a recess 101c, in which a yoke 106 is lodged in tight-fit relation. As best seen in FIG. 3, yoke 106 is of an arcuate shape to extend 180° around the radially inner end of swashplate arm 90 fixed on output shaft 16. The terminations of the yoke are in the form of diametrically opposed trunnions 106a that receive pins 108 for pivotally connecting the yoke to swashplate 22.

Piston part 102 includes a cylindrical skirt 102a slidingly mounted on a large diameter cylindrical section 70a of output shaft flange 70 and a radially turned shoulder 102b terminating in an axially turned lip 102c that bears against a reduced diameter cylindrical extension 70b of output shaft flange 70. The left radial face of shoulder 102b and the radial transition between the large and reduced diameter cylindrical sections of output flange 70 define the axial bounds of an annular actuating chamber 110. Seals 105 fitted in skirt 102a and lip 102c of piston part 102 prevent hydraulic fluid leakage from actuating chamber 110.

As will be seen in the description to follow, actuating piston 100 is driven in opposite axial directions by creating differential hydraulic fluid pressures in actuating chambers 104 and 110. That is, when the fluid pressure in actuating chamber 104 exceeds the fluid pressure in actuating chamber 110, actuating piston 100 is driven leftward. By virtue of the fixed connection between the actuating piston and yoke 106, the pivotal connection (pins 108) of the yoke to the swashplate 22 about a pivot axis intersecting the output shaft axis at a right angle (axes of pins 108), and the pivotal connection of the swashplate to arm 90 (pin 92), a leftward stroke of the actuating piston produces counterclockwise pivotal motion of the swashplate about pivot pin 92.

As described in the cited patents, clockwise pivotal motion of the swashplate decreases transmission ratio. When the left (input) face of the swashplate is normal to the output shaft axis, so is pump cylinder block 52. There is then no precessing motion of the rotating pump cylinder block, and consequently pump pistons 50 do not reciprocate in pump cylinder 51 to pump hydraulic fluid. This is the neutral (1:0 transmission setting) of swashplate 22.

On the other hand, when the hydraulic fluid pressure in actuating chamber 110 exceeds the fluid pressure in actuating chamber 104, actuating piston 100 is driven rightward to pivot swashplate 22 in the clockwise direction and thus increase transmission ratio. A 1:1 transmission ratio is achieved when the right (output) face of the swashplate is normal to output shaft axis 25 (the angular orientation illustrated in FIG. 1). In this swashplate orientation, motor cylinder block 62 is also normal to the output shaft axis. Consequently, motor pistons 60 do not reciprocate in their motor cylinders 64 and do not pump hydraulic fluid. The mechanical, hydromechanical and hydrostatic torque components acting on the swashplate then additively drive output shaft 16 at the same speed as the input shaft, i.e., 1:1 transmission ratio. Actuating piston part 101 is provided with a slot 101c through which swashplate arm 90 extends; the slot being axially elongated to provide sufficient clearance to accommodate full axial movement of actuating piston 100.

As a second element of ratio controller 24, a ratio control valve, generally indicated at 120, is accommodated in a counterbore 122 drilled into the output end of output shaft 16, as seen in FIG. 1. This counterbore is sealed off by an endplug 123. Ratio control valve 120 is axially positioned within counterbore 122 by the control pressure of makeup hydraulic fluid pumped by sump pump 40. As diagrammatically indicated in FIGS. 1 and 4, makeup fluid drawn from sump 42 by pump 40 is pumped through passages (commonly indicated at 124) in a valve block 125 mounted by housing 12 in a submerged position within the sump. These passages lead to a proportional solenoid pressure reducing valve 126 mounted in the valve block. From this solenoid valve, hydraulic fluid flows through passages (commonly indicated at 127) in manifold block 56, portplate 86, output shaft flange 84, and endplug 123 to a control valve actuating chamber 128 defined between endplug 123 and a piston head 130 of control valve 120. As indicated in FIG. 4, makeup hydraulic fluid pumped by pump 40 also flows through either one of check valves 131, portplate 86, manifold block 56, and hydraulic motor unit 20, at the low pressure side of swashplate 22 to replenish hydraulic fluid losses. Reference may be had to cited U.S. Pat. No. 5,486,192 for details of a suitable makeup hydraulic fluid circuit.

Affixed to and extending leftwardly from valve piston head 130 is an axially elongated valve spool 132 that is slidingly received in a valve body 134 fixedly positioned in counterbore 122. As described below, depending on the axial position of valve spool 132, ratio control actuating chamber 104 is either pressurized or vented via an angular passage 136 in the output shaft leading to counterbore 122, ratio control actuating chamber 110 is either pressurized or vented via an axial passage 138 in the output shaft leading to the counterbore, and a lock-up clutch actuating chamber 140 is either pressurized or vented via passages 142 in the output shaft and output flange 70 leading to the counterbore. Access to fluid pressure existing in the high pressure side of swashplate 22 for pressurizing these actuating chambers is obtained via hydraulic motor unit 20, manifold block 56, portplate 86, and output shaft passage 144 leading to an annular cavity 146 provided between counterbore 122 and valve body 134. Again, reference may be had to U.S. Pat. No. 5,486,142 for hydraulic motor unit, manifold block, and portplate details appropriate for tapping hydraulic fluid from the high pressure side of swashplate 22. Access to atmospheric pressure for venting these actuating chambers 104, 110, and 140, is obtained through output shaft passage 148 leading to an annular cavity 150 formed between counterbore 122 and valve body 134.

Figure 5:
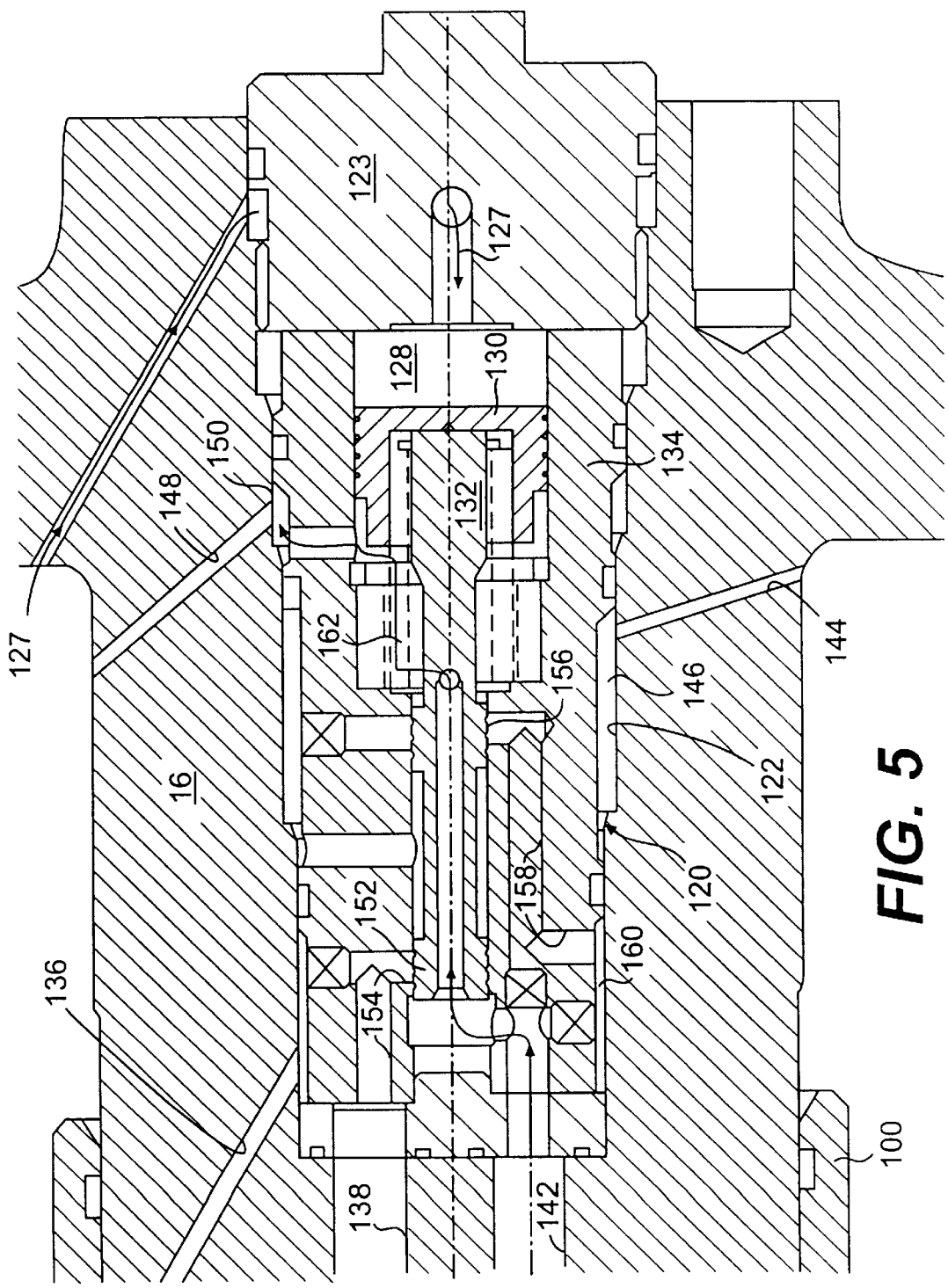
FIGS. 5–8 are fragmentary sectional views illustrating four positions of a transmission ratio control valve seen in FIGS. 1 and 4.

FIG. 5 illustrates control valve spool 132 as positioned by the controlled pressure exerted on valve piston head 130 by operation of solenoid valve 126 to set transmission to any desired transmission ratio from 1:0 up to 1:1. It is seen that a land 152 on valve spool 132 blocks internal passages 154 in valve body 134 leading to output shaft passage 138, thus isolating actuating chamber 110. Similarly, a valve spool land 156 blocks internal valve body passages 158 leading to an annular cavity 160 between counterbore 122 and output shaft passage 136, thus isolating actuating chamber 104. As a result, the pressures of the hydraulic fluid trapped in these actuating chambers equalize to fix the axial position of actuating piston 100 and thus hold a transmission setting. At the same time, a fluid circuit, diagrammatically indicated at 162, is opened throughout output shaft passages 142 and 148, and valve body 134 and valve spool 132 passages to annular cavity 150. Thus, lock-up clutch actuating chamber 140 is vented such that lock-up clutch plate 74 is biased to a disengaged position by springs, one diagrammatically indicated at 164 in FIG. 2.

Figure 6:
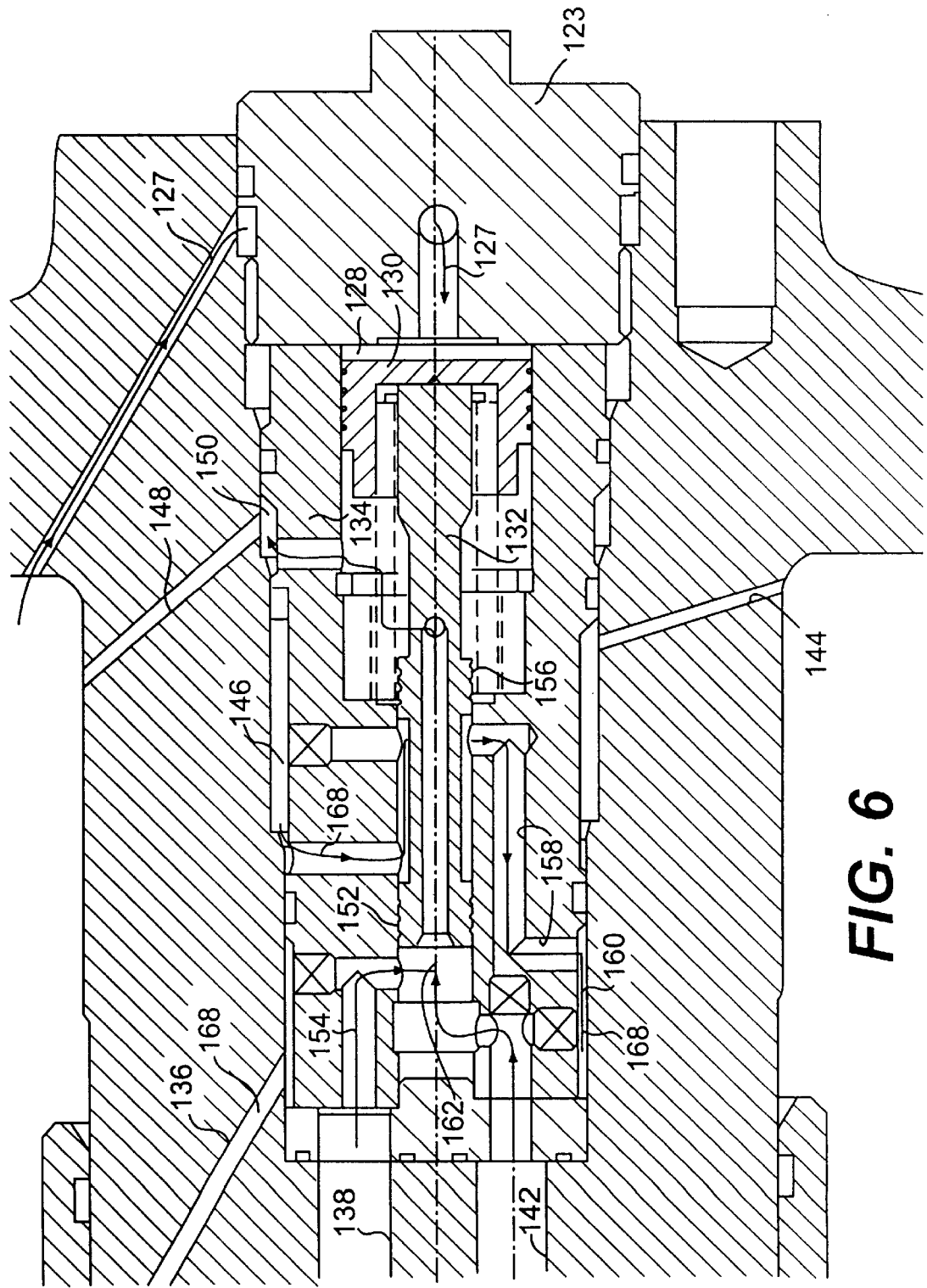

FIG. 6 illustrates control valve spool 132 as positioned by solenoid valve 126 to decrease or down-stroke transmission ratio. As seen, land 152 has moved to unblocked valve body passages 154, such that output shaft passage 138 leading to ratio control actuating chamber 110 is coupled into fluidic circuit 162 that vents lock-up clutch actuating chamber 140 to maintain lock-up clutch disengagement. Thus, actuating chamber 110 is also vented to atmospheric pressure. However, valve spool land 156 has moved to unblock valve body internal passages 158, thus opening a fluidic circuit, diagrammatically indicated at 168, between annular cavity 146 containing high pressure hydraulic fluid and ratio control actuating chamber 104. This actuating chamber is then pressurized to drive actuating piston 100 leftward, thereby producing counterclockwise, ratio-decreasing pivotal movement of swashplate 22.

Figure 7:
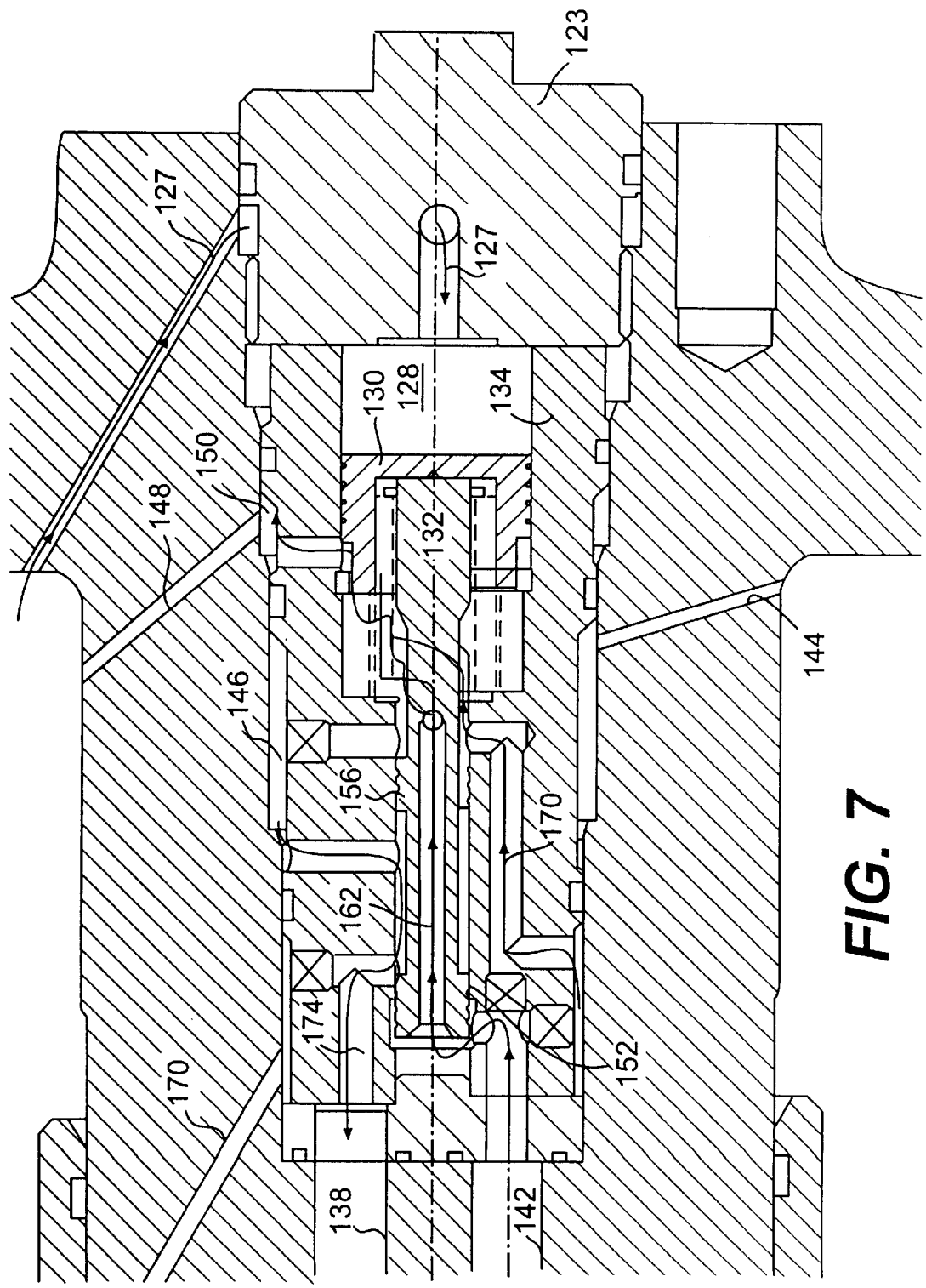

FIG. 7 illustrates control valve spool 132 as positioned by solenoid valve 126 to increase or up-stroke transmission ratio. It is now seen that land 156 is in position to open a venting fluid circuit, diagrammatically indicated at 170, between ratio control actuating chamber 104 and atmospheric pressure in annular cavity 150. This position of land 156 is seen in FIG. 7 to also block fluidic circuit 168 in FIG. 6 leading from high fluid pressure cavity 146 to actuating chamber 104. Fluidic circuit 162 continues to be open, such that lock-up clutch actuating chamber 140 remains vented. However, land 152 is now in a leftward position to establish a fluidic circuit, diagrammatically indicated at 174, leading from high pressure fluid cavity 146 through valve body 134 and output shaft passage 138 to actuating chamber 110. This chamber is then pressurized as actuating chamber 104 is vented, such that actuating piston 100 is driven rightward to pivot swashplate 22 in a clockwise, ratio-increasing (up-stroke) direction. Actuating chamber 140 remains vented via fluidic circuit 162, such that lock-up clutch 26 is still disengaged.

Figure 8:
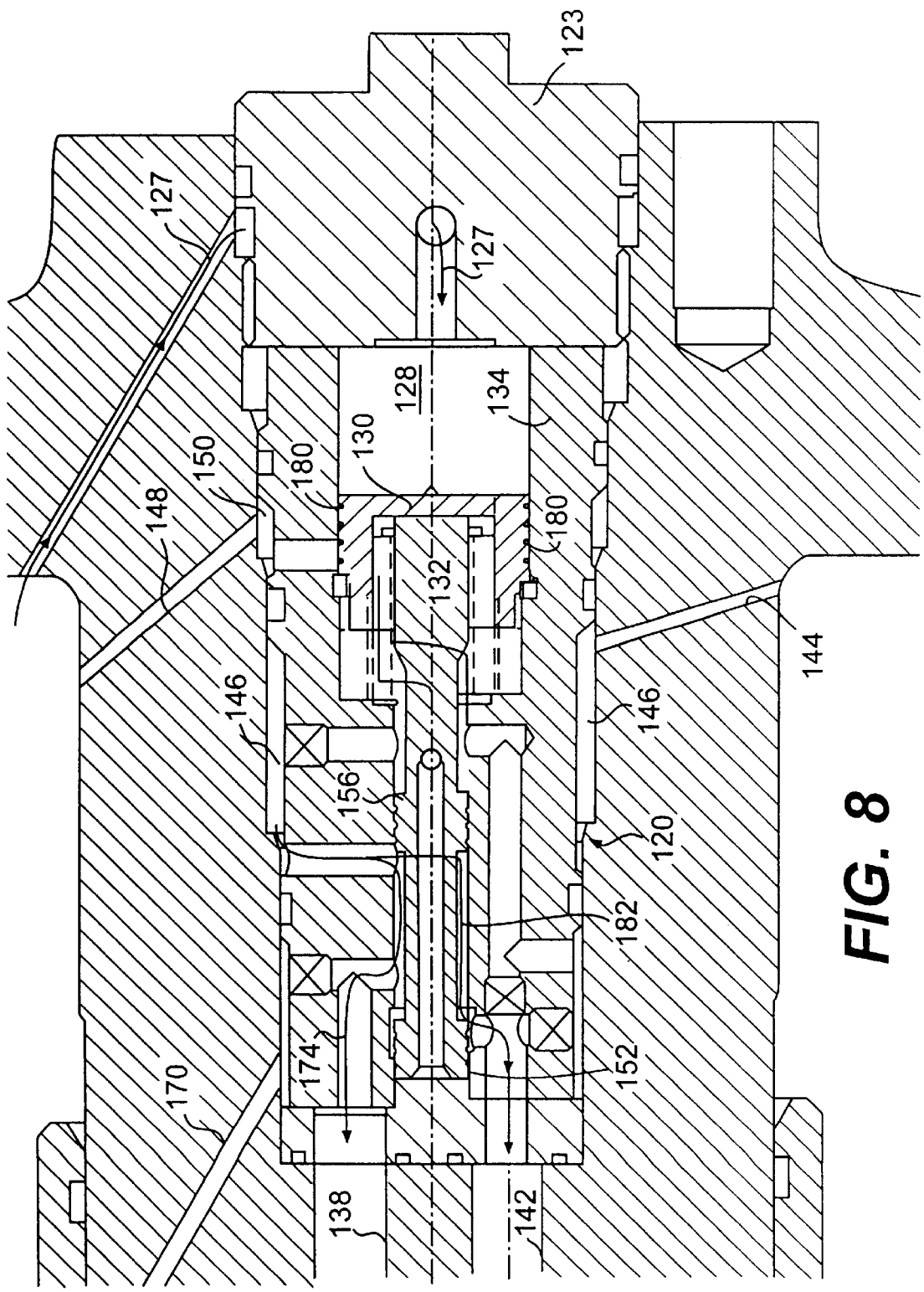

When the position of valve spool 132 in FIG. 7 up-strokes swashplate to the 1:1 transmission ratio, solenoid valve 126 moves the valve spool to the axial position seen in FIG. 8. Land 152 is positioned to an extreme leftward position, which is seen to not interrupt fluid circuit 174 in FIG. 7. Thus, ratio control actuating chamber 110 continues to be pressurized, tending to drive ratio control actuating piston 100 rightward. Land 156 continues to interrupt fluidic circuit 168 in FIG. 6 leading from high pressure fluid cavity 146 to ratio control actuating chamber 104. However, a valve spool land 180 is now in position to block venting access to cavity 150. Thus, venting fluidic circuits 162 to lock-up clutch actuating chamber 140 and 170 to ratio control actuating chamber 104 in FIG. 7 are now interrupted. Since actuating chamber 104 is then isolated, the pressure of hydraulic fluid trapped therein assumes a level that counterbalances the fluid pressure in actuating chamber 110 established via fluidic circuit 174. The position of actuating piston 100 is thus fixed to sustain the 1:1 ratio position of swashplate 22. Moreover, the position of land 156 in FIG. 8 establishes a fluidic circuit, diagrammatically indicated at 182, leading from high fluid pressure cavity 146 to lock-up clutch actuating chamber 140. The resulting pressurization of this chamber drives clutch plate 74 into engagement with lip 37 of input shaft flange 36, thus engaging lock-up clutch 26 to establish a direct input-to-output shaft mechanical drive coupling that bypasses the hydraulic components of transmission 10. It will be appreciated that this direct mechanical coupling afforded by engagement of lock-out clutch 26 provides 1:1 transmission ratio operation of improved efficiency.

FIG. 4 provides a simplified diagram of the hydraulic circuitry described above with reference to the other drawing figures. Elements seen in FIG. 4, but not previously mentioned, are a hydraulic fluid cooler 190 and check valves 192 to ensure that output shaft passage 144 is only fluid coupled to the high pressure side of swashplate 22. Position "2" of control valve 120 represents the valve spool position in FIG. 5 that sets a transmission ratio. Control valve position "1" represents the valve spool position in FIG. 6 that down-strokes transmission ratio. Note that a spring 194 may be added as a safety measure to bias the control valve spool into position "1" in the event control valve positioning fluid pressure from solenoid valve 126 is lost. Control valve position "3" represents the valve spool position in FIG. 7 to up-stroke transmission ratio, and control valve position "4" represents the valve spool position in FIG. 8 that sets the 1:1 transmission ratio and engages lock-up clutch 26.

As further illustrated in FIG. 4, a controller 196 may be adapted to electrically control solenoid valve 126, such as to selectively pressurize control valve actuating chamber 128 and thus achieve desired control valve positionings and associated transmission ratio control in response to a variety of parameter inputs, such as input shaft speed, output shaft speed, throttle position, etc.

It will be apparent to those skilled in the art that various modifications and variations can be made to the apparatus of the present invention without departing from the spirit of the invention. Thus, it is intended that the present invention be construed to cover modifications and variations thereof, provided they come within the spirit and scope of the appended claims and their equivalents.

What is claimed is:

1. A continuously variable hydrostatic transmission comprising:
   a housing;
   an input shaft journaled in the housing;
   a hydraulic pump unit driven by the input shaft;
   a hydraulic motor unit grounded to the housing;
   an output shaft journaled to the housing;
   a wedge-shaped swashplate positioned between the hydraulic pump and motor units and including ports accommodating pumped flow of hydraulic fluid between the hydraulic pump and motor units, the swashplate connected to the output shaft in torque-coupled relation and pivotal to an infinite number of angular positions to respectively set an infinite number of transmission ratios;
   a lock-up clutch for selectively coupling the input shaft directly to the output shaft; and
   a ratio controller coupled to pivot the swashplate to angular positions setting transmission ratios between 1:0 and 1:1 and engaging the lock-up clutch when the swashplate is pivoted to an angular position setting the 1:1 transmission ratio.

2. The transmission of claim 1, wherein the ratio controller includes:
   an actuating piston linked to the swashplate;
   first and second actuating chambers; and
   a hydraulic circuit including fluid valving selectively operable to create differential fluid pressures in the first and second actuating chambers, thereby producing movements of the actuating piston to pivot the swashplate in opposed transmission ratio-increasing and transmission ratio-decreasing directions, and to engage the lock-up clutch to couple the input shaft to the output shaft when the transmission ratio is increased to 1:1.

3. The transmission of claim 2, wherein the fluid valving includes a control valve incorporated in one of the input and output shafts, and the hydraulic circuit includes first, second, and third fluid passages in the one shaft respectively leading from the control valve to the first actuating chamber, the second actuating chamber, and a third actuating chamber that is pressurized to engage the lock-up clutch.

4. The transmission of claim 3, wherein the hydraulic circuit further includes a positioning valve fluidically coupled to selectively move the control valve into multiple valve positions in response to output shaft speed commands input by an operator.

5. The transmission of claim 4, wherein the control valve includes:

- a first valve position that isolates the first and second actuating chambers and vents the third actuating chamber to set a transmission ratio between 1:0 and 1:1;
- a second valve position that vents the first and third actuating chambers and pressurizes the second actuating chamber to decrease the transmission ratio;
- a third valve position that vents the second and third actuating chambers and pressurizes the first actuating chamber; and
- a fourth valve position that pressurizes the first and third actuating chambers and isolates the second actuating chamber at the 1:1 transmission ratio.

6. The transmission of claim 5, wherein the control valve and first, second, and third fluid passages are provided in the output shaft.

7. The transmission of claim 6, wherein the actuating piston and the first and second actuating chambers are annular elements surrounding the output shaft.

8. The transmission of claim 7, wherein the actuating piston is mounted on the output shaft for movement in opposed axial directions.

9. The transmission of claim 8, wherein the ratio controller further includes a yoke fixed to the actuating piston and pivotally connected to the swashplate at a transverse pivot axis intersecting a longitudinal axis of the output shaft.

10. The transmission of claim 9, further including a transverse arm fixed to the output shaft at one end and having a free end pivotally connected to the swashplate.

* * * * *